US012123649B2

(12) United States Patent
Wong Chen et al.

(10) Patent No.: US 12,123,649 B2
(45) Date of Patent: Oct. 22, 2024

(54) PORTABLE CLOTHES DRYING DEVICE

(71) Applicants: Mark Wong Chen, Flushing, NY (US); William Albert Stanton, Buffalo, NY (US)

(72) Inventors: Mark Wong Chen, Flushing, NY (US); William Albert Stanton, Buffalo, NY (US)

( * ) Notice: Subject to any disclaimer, the term of this patent is extended or adjusted under 35 U.S.C. 154(b) by 496 days.

(21) Appl. No.: 17/486,448

(22) Filed: Sep. 27, 2021

(65) Prior Publication Data

US 2023/0100045 A1 Mar. 30, 2023

(51) Int. Cl.
*F26B 21/00* (2006.01)
*F26B 9/10* (2006.01)

(52) U.S. Cl.
CPC .............. *F26B 21/006* (2013.01); *F26B 9/10* (2013.01)

(58) Field of Classification Search
CPC .......... F26B 21/006; F26B 9/10; F26B 9/003; F26B 21/004; F26B 21/008; F26B 21/001
USPC .......................................... 34/104; 182/202
See application file for complete search history.

(56) References Cited

U.S. PATENT DOCUMENTS

| | | | | |
|---|---|---|---|---|
| 5,044,468 | A * | 9/1991 | Worthington, Jr. | E06C 7/44 182/202 |
| 8,857,072 | B1 * | 10/2014 | Cocker | F26B 9/003 34/106 |
| 2015/0033575 | A1 * | 2/2015 | Ciarallo | F26B 9/003 34/239 |
| 2018/0333007 | A1 * | 11/2018 | Ganahl | A47J 31/005 |
| 2019/0216225 | A1 * | 7/2019 | Volk | A47C 9/08 |
| 2021/0222353 | A1 * | 7/2021 | Durham | D06F 59/04 |
| 2022/0243984 | A1 * | 8/2022 | Bekker | F26B 21/001 |

FOREIGN PATENT DOCUMENTS

CN 111426164 A 7/2020

* cited by examiner

*Primary Examiner* — John P McCormack
(74) *Attorney, Agent, or Firm* — MUNCY, GEISSLER, OLDS & LOWE, P.C.

(57) ABSTRACT

Provided herein is a portable clothes drying device, which includes a base unit and an air outlet unit; wherein the base unit is configured to not only enable the portable clothes drying device to be used in various kinds of use spaces, but also provide the portable clothes drying device with the functions of heating, drying, disinfecting, etc.; and wherein the air outlet unit is configured to correspond to various kinds of clothes with different geometric shapes.

10 Claims, 8 Drawing Sheets

PORTABLE CLOTHES DRYING DEVICE

BACKGROUND OF THE INVENTION

1. Technical Field

The present disclosure generally relates to the field of a drying device. More particularly, the present disclosure relates to a portable clothes drying device.

2. Description of the Prior Art

Drying device is one of the most important household appliances in the modern society. It is essential to relatively humid climate and environment, and for some high altitude areas with snow in the winter, such device is also highly demanded. For example, in snowing regions, people often require to wear heavy clothes, gloves and snow boots, etc. during outdoor activities; however, snow can be easily attached to clothes during such activities, or before driving, snow accumulation in front of the car windshield is also required to be removed, such that some clothes tend to become wet after going outdoor. To prevent loss of insulation function of clothes due to moisture or wetness, or to prevent growth of bacteria or mold, such wet clothes need to be dried repetitively. However, most known drying devices are not portable, and their structures are not facilitated for the drying of clothes with complicated shapes, such as gloves or snow boots.

In this field, there are numerous types of known drying devices, including some improved products. For instance, Chinese Invention Patent No. CN111426164A discloses a deodorant drying device, comprising a stand and a plurality of supporting rods distributed on the stand, such that it is able to achieve the objective of drying a plurality of boxing gloves simultaneously. However, the aforementioned deodorant drying device is applicable to limited types of clothes only, and it is inconvenient for carrying.

BRIEF SUMMARY OF THE INVENTION

The purpose of the summary of the invention is to provide a brief summary of the disclosure in order to allow readers to have basic understanding of the present invention. The summary of invention does not refer to the complete and detailed description of the present invention, and its purpose is not to illustrate the important or essential elements of embodiments of the present invention or to define the scope of the present invention.

In view of the aforementioned requirements and limitations, an objective of the present invention is to provide a drying device that is convenient for carrying and is applicable to various types of clothes. The drying device of the present invention is applicable various types of cup holders and is also to prevent air intake passages from being shielded by the walls of the cup holder. In addition to car use, the drying device of the present invention is also convenient for carrying and use in various locations (such as: offices, camp sites, various home spaces). Furthermore, when the drying device is placed stationarity for use, it is able to prevent tipping over due to the weight of the clothes. The drying device can further comprise a disinfection unit in order to prevent the possibility of breeding of bacteria on the clothes under humid environment.

Accordingly, one aspect of the present invention relates to a portable clothes drying device, comprising a base unit, which comprises: an air inlet provided at a bottom of the base unit; a plurality of feet provided on the bottom of the base unit around the air inlet, wherein the plurality of feet extend from a surface of the bottom of the base unit; a heating part provided inside the base unit; and an exhaust part provided inside the base unit. The portable clothes drying device also comprises an air outlet unit connected to the base unit, wherein a surface of the air outlet unit is provided with an air outlet hole. The exhaust part draws in an external air through the air inlet and sends it into the air outlet unit, and then the air is sent to an outside through the air outlet hole.

In an embodiment of the portable clothes drying device, the plurality of feet have a bottom surface parallel to the surface of the bottom of the base unit, and the bottom surface of the plurality of feet and the surface of the bottom of the base unit are not the same plane.

In an embodiment of the portable clothes drying device, each of the plurality of feet is further provided with a supporting element, which is pivotally connected to one end of each of the plurality of feet.

In an embodiment of the portable clothes drying device, the supporting element is a supporting piece, and a spring structure is provided between the supporting element and each of the plurality of feet to provide an elastic restoring force to open the supporting element and each of the plurality of feet.

In an embodiment of the portable clothes drying device, the base unit is further provided with a battery module and a power input part, the power input part is used for electrically connecting with an external power source, and a power source of the base unit is provided by the battery module or the power input part.

In an embodiment of the portable clothes drying device, the base unit further comprises a heat insulation layer provided on an outer surface of the base unit.

In an embodiment of the portable clothes drying device, the base unit further comprises a disinfection part provided inside the base unit or inside the air outlet unit.

In an embodiment of the portable clothes drying device, the air outlet unit further comprises a plurality of extending parts respectively extending in a direction away from the base unit, and each of the plurality of extending parts has a surface provided with the air outlet hole.

In an embodiment of the portable clothes drying device, each of the plurality of extending parts is provided with a plurality of extending ends, the plurality of extending ends are arranged at intervals, and at least one of the plurality of extending ends is provided with an joint element so as to adjust the interval of the plurality of extending ends.

In an embodiment of the portable clothes drying device, each of the plurality of extending parts and/or each of the plurality of extending ends is provided with a telescoping element so as to adjust the length.

In an embodiment of the portable clothes drying device, the base unit can be placed in a cup holder for a car.

The portable clothes drying device provided by the present invention has the advantages of: with the use of special foot structural characteristics, the portable clothes drying device can be stably placed in any type of space while ensuring that the air intake passage is not shielded by the device. Furthermore, the portable clothes drying device can also be used to provide the functions of heating, drying and disinfection simultaneously. Moreover, the extension portion of the portable clothes drying device is equipped with a spacing adjustment element or expendable element such that it can be adjusted for different types of clothes.

According to the usual working methods, the various features and components in the figures are not drawn according to the actual scale. The drawings present the specific features and components related to the present invention in the best way. In addition, between different drawings, the same or similar element symbols refer to similar elements and components.

DETAILED DESCRIPTION OF THE INVENTION

In this section, the contents of the present invention will be described in detail through the following examples. These examples are for illustration only, and those skilled in the art can easily think of various modifications and changes. Various embodiments of the present invention will be described in detail below. In this specification and the appended patent applications, unless the context clearly indicates otherwise, "a" and "the" can also be interpreted as plural. In addition, in this specification and the scope of the attached patent application, unless otherwise stated in the context, "middle" and "inner" include "located in"; and unless otherwise stated in the context, the direction of the tip of the projectile was defined as "upper" or "lower". Furthermore, titles and subtitles may be attached to the description for easy reading, but these titles do not affect the scope of the present invention.

Figure 1:
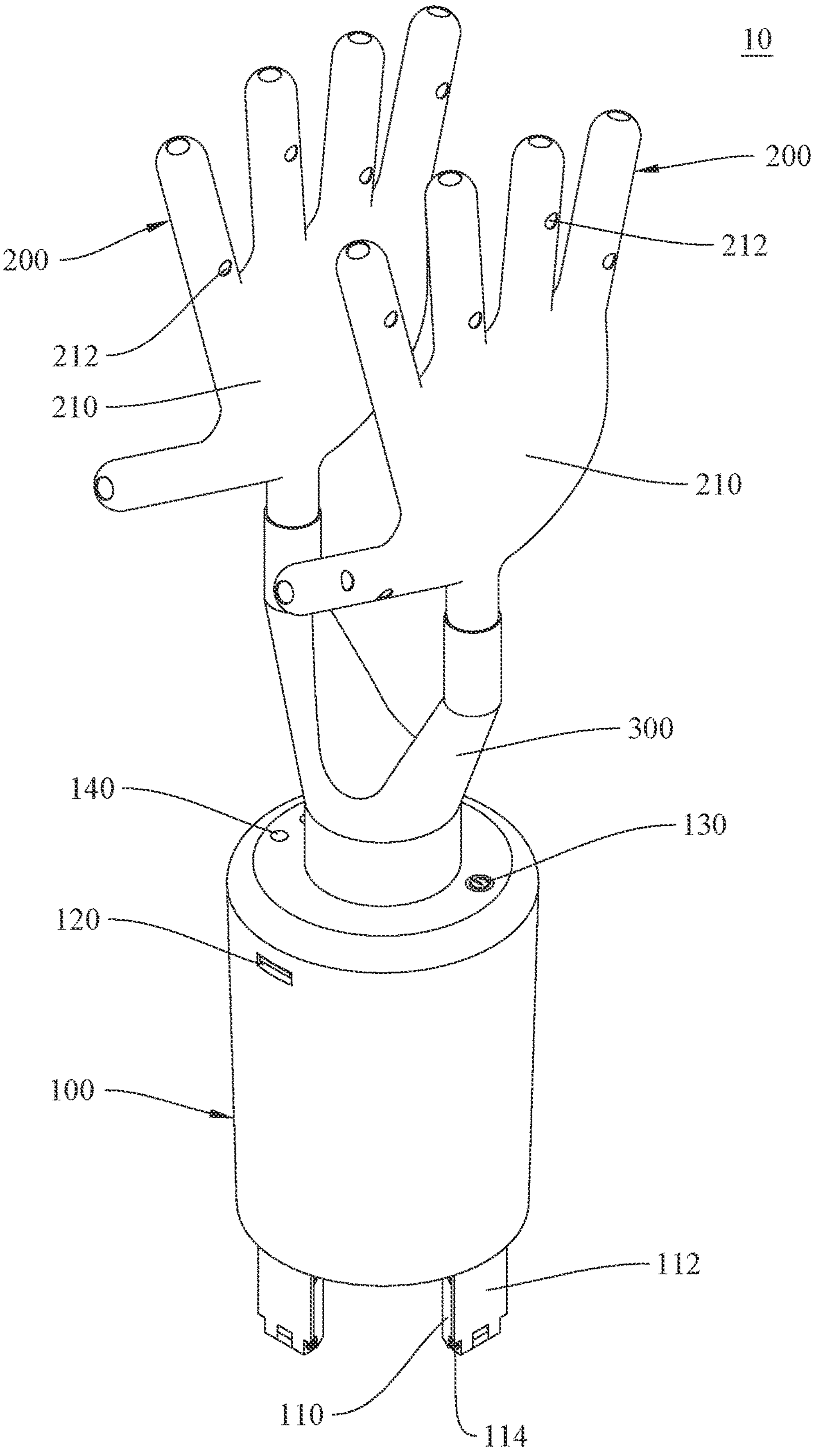
FIG. 1 is perspective view of the portable clothes drying device according to an embodiment of the present invention.

FIG. 1 is perspective view showing a portable clothes drying device 10 according to an embodiment of the present invention. As shown in FIG. 1, the portable clothes drying device 10 comprises a base unit 100 and an air outlet unit 200. The base unit 100 is arranged underneath the air outlet unit 200, and the two are connected to each other via a connecting part 300.

In a preferred embodiment, the base unit 100 is a hollow column housing, and the bottom of the base unit 100 is provided with a plurality of feet 110. Preferably, the plurality of feet 110 are arranged around the bottom surface of the base unit 100 at intervals from each other with an equal distance. In addition, one end of each one of the plurality of feet 110 is pivotally attached to each one of a plurality of supporting elements 112, and a spring structure 114 is arranged between the two. The side surface of the base unit 100 is further provided with a power input part 120, and it further includes a power switch 130 and at least one indicator light 140 on a surface adjacent to the air outlet unit 200.

The air outlet unit 200 further comprises at least one extending part 210. The extending part 210 is connected to the connecting part 300, and its surface is provided with at least one air outlet hole 212. According to an embodiment of the present invention, the air outlet unit 200 comprises a plurality of the extending parts 210, and the surface of the plurality of extending parts 210 further comprises a plurality of air outlet holes 212 respectively.

Figure 2:
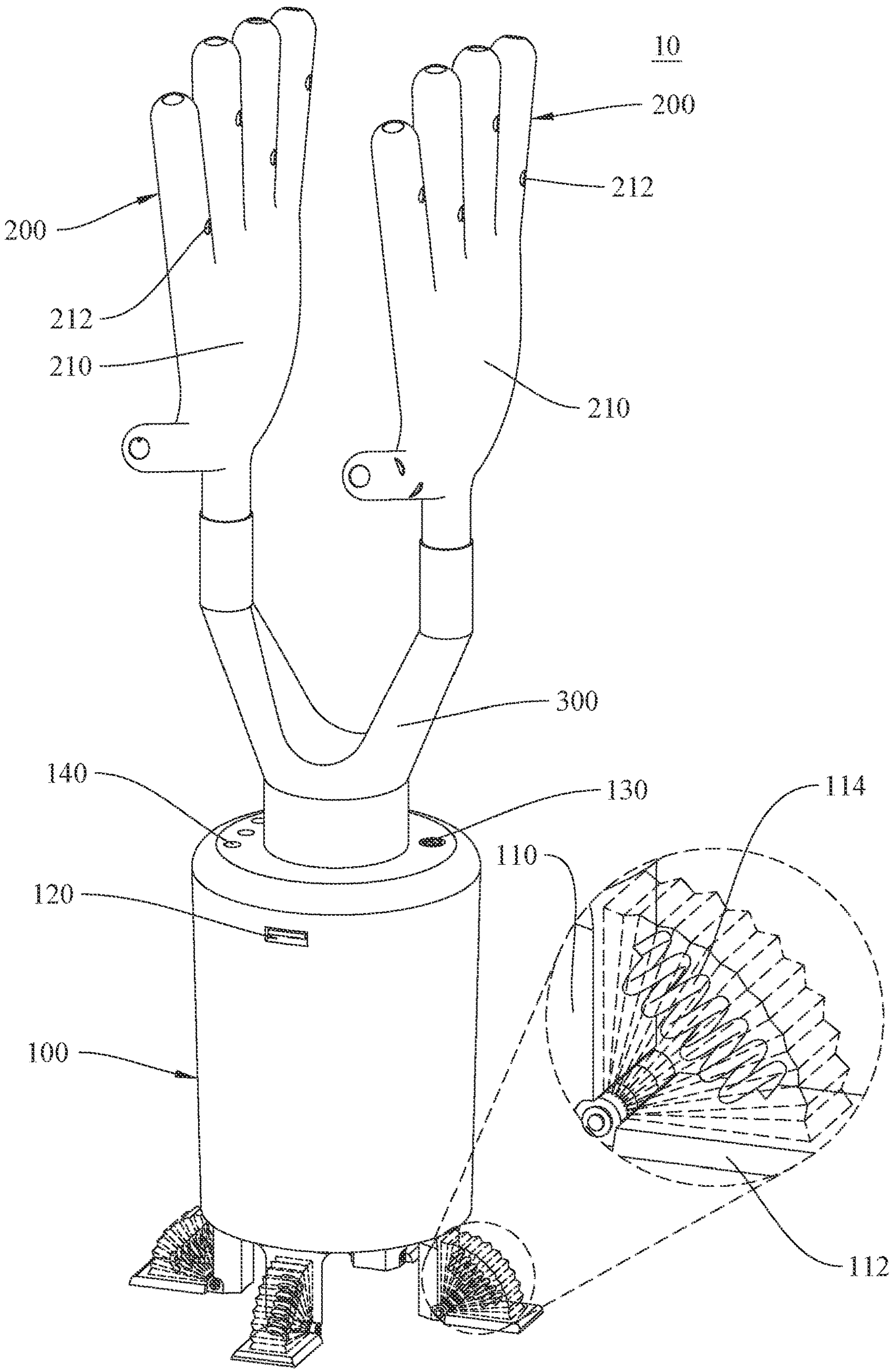
FIG. 2 is perspective view of the portable clothes drying device according to an embodiment of the present invention.
Figure 3A:
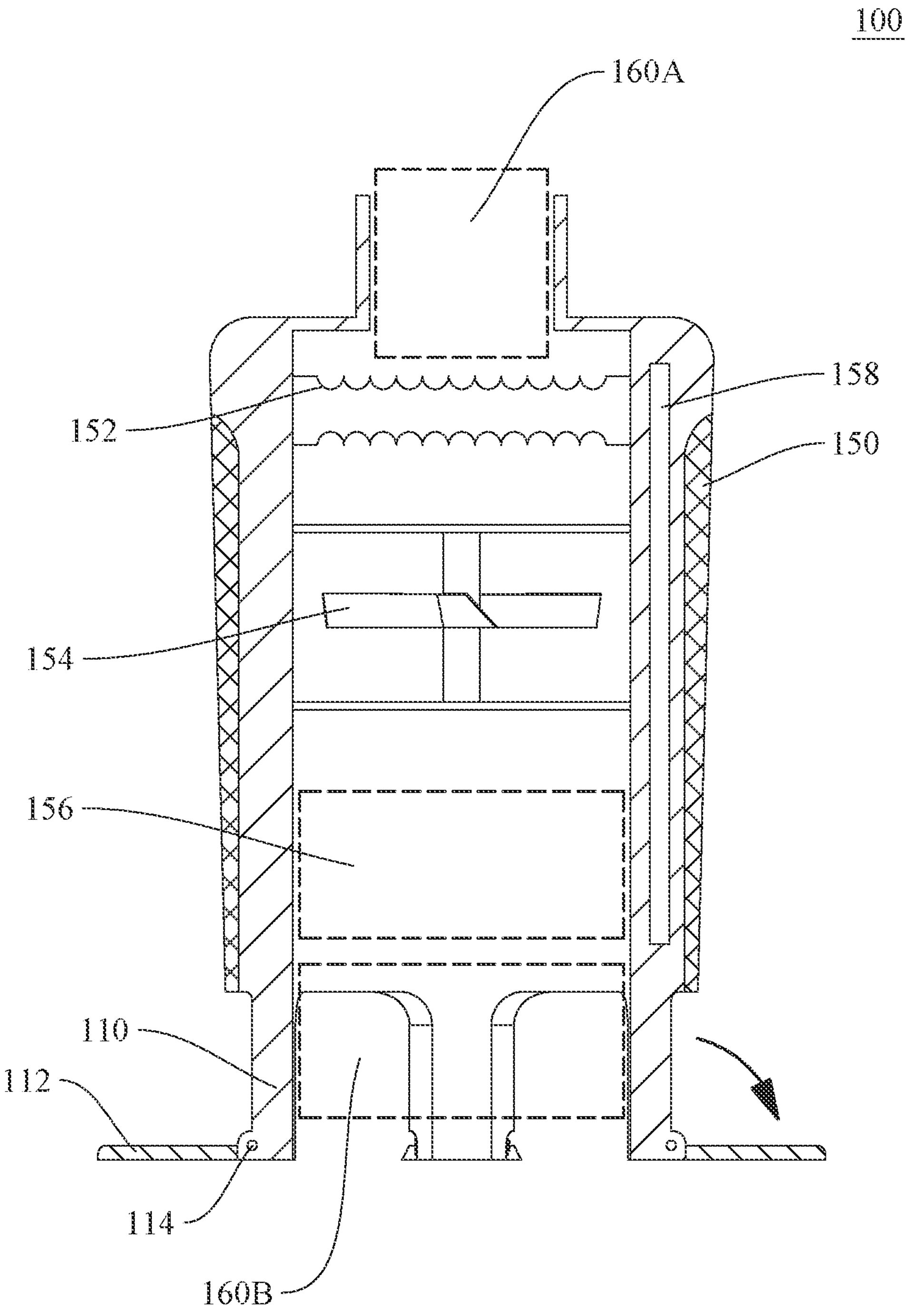
FIG. 3A and FIG. 3B are cross sectional view and top view of the base unit according to an embodiment of the present invention respectively.
Figure 3B:
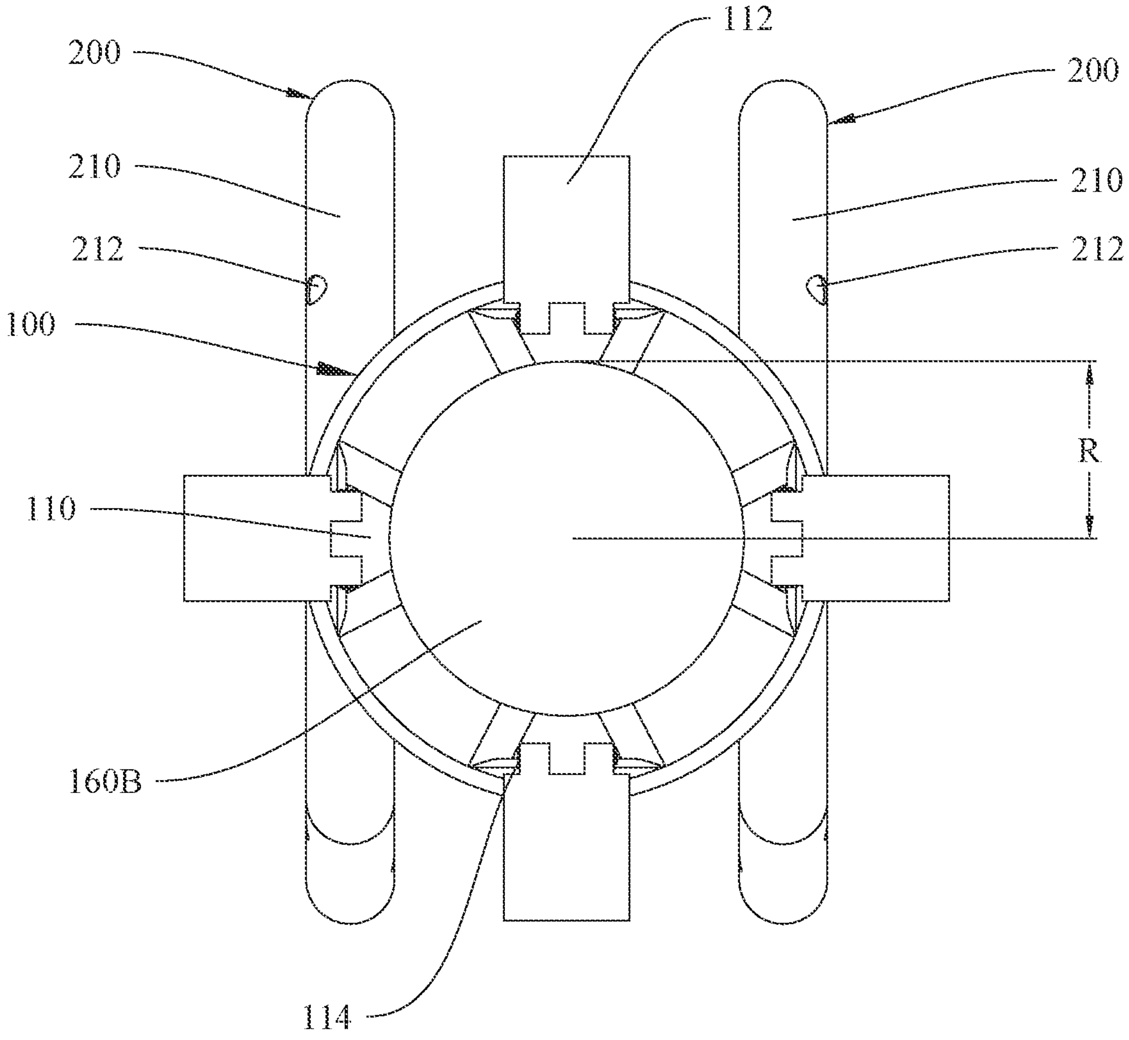

FIG. 3A and FIG. 3B show the cross sectional view and top view of the base unit 100 according to an embodiment of the present invention respectively. Please refer to FIG. 1 to FIG. 3B at the same time. The plurality of feet 110 substantially extend from the bottom surface of the base unit 100. Preferably, the bottom surface of the plurality of feet 110 are parallel to the bottom surface of the base unit 100, and the two bottom surfaces are not on the same plane. In other words, the spacing between the plurality of feet 110 and the distance between the bottom surface of the plurality of feet 110 and the bottom surface of the base unit 100 are able to jointly form a gap for air to pass there through. In addition, the spring structure 114 arranged between each one of the plurality of feet 110 and the supporting element 112 is able to provide an elastic restoring force to open the supporting element 112 and each one of the plurality of feet 110. In other words, unless a force opposite from the elastic restoring force is applied to the spring structure 114, the supporting element 112 and each one of the plurality of feet 110 tend to open normally. However, during the opening, the angle between the each one of the feet 110 and the supporting element 112 can be adjusted depending upon the needs, and the present invention is not limited to any specific angle value. Furthermore, the spring structure 114 is configured in such a way that, without deviating from the concept of the present invention, some minor adjustments are permitted. For example: in an embodiment of the present invention, the spring structure 114 (such as: a spring) can be connected to the two surfaces corresponding to the supporting element 112 and each one of the plurality of feet 110 respectively, and its external can covered by a collapsible fan shaped structure in order to protect the spring structure 114, such that its appearance shows an accordion-like structure, as shown in FIG. 2. Moreover, according to another embodiment of the present invention, the spring structure 114 is arranged parallel to the attachment surface between the supporting element 112 and the each one of the plurality of feet 110, such that it is able to pivotally rotate with the such structure as the rotating axis during the opening of the supporting element 112 and each one of the plurality of feet 110. In addition, a locking structure (not shown in the drawings) can be provided depending upon the needs in order to allow the plurality of supporting elements 112 to be stored at the plurality of feet 11.

According to the aforementioned content, the base unit 100 can be a hollow column housing. The upper end of the base unit 100 includes a connection opening 160A fluidly connected to and attached with the connecting part 300. The lower end of the base unit 100 includes an air inlet 160B, and air is able to enter from the external via the air inlet 160B in order to enter into the internal space of the base unit. The internal space of the base unit 100 includes a heating part 152, an exhaust part 154 and a disinfection part 156. Preferably, the heating part 152, the exhaust part 154 and the disinfection part 156 between the connection opening 160A and the air inlet 160B are arranged sequentially in a topdown manner, such that the exhaust part 154 is able to draw air from the external to pass through the air inlet 160B in order to enter into the internal space of the base unit 100, and to sequentially pass through the disinfection part 156 and the heating portion 152, which then enters the connecting part 300 via the connection opening 160A and further to the air outlet unit 200. To be more specific, the heating part 152 comprises at least one known heating element capable of converting electricity into thermal energy in order to heat the air. The known heating element may include but not limited to a heating coil. The exhaust part 154 comprises at least one known fan such that by rotating the fan, air passage can be driven to pass through such part. In an embodiment of the present invention, the disinfection part 156 comprises at least one ultraviolet light source and/or negative ion disinfectant (not shown in the drawings). To be more specific, the projection direction of the ultraviolet light source is toward the connection opening 160A, an the negative disinfectant can exist in the liquid or gas form, and it is able to transmit to the air outlet unit 200 via the air flow of the disinfection part 156 In another embodiment, the disinfection part can also be arranged at the internal (not shown in the drawings) of the air outlet unit. For example: the disinfection part is an ultraviolet light source, and the air outlet unit can be a light transmissive type (such as: transparent, perforation or mesh, etc.) in order to allow the clothes arranged at the external of the air outlet unit to receive heated air and to also undergo ultraviolet disinfection at the same type.

The base unit 100 is provided with a battery 158 and a power input part 120 electrically connected to the heating part 152, the exhaust part 154 and the disinfection part 156, and the power input part 120 is used to obtain electricity from an external power source in order to further supply electricity to the heating part 152, the exhaust part 154 and the disinfection part 156. Preferably, the base unit 100 can be further provided with a control part (not shown in the drawings) depending upon the needs, and it is used to connect the power source 130 to the heating part 152, the exhaust part 154 and the disinfection part 156 respectively, thereby allowing the user to control the switch of corresponding elements according to the functional needs. In another preferred embodiment, the base unit is provided with a battery module (such as: battery 158). The battery module can be rechargeable type, and the power source of the base unit can be independently provided by the battery module in order to facilitate the user during the portable use of the device.

The outer surface of the base unit 100 further comprises a heat insulation layer 150. The heat insulation layer 150 comprises a known heat insulation material such that when the user holds the base unit, it is able to isolate the heat dissipated from the heating part 152. In addition, to allow the present invention to be used in conventional transportation means, preferably, the base unit 100 is designed to be suitable for placing inside a receiving space of conventional transportation means, such as placing inside a cup holder of a car. The base unit 100 can be in a cylindrical-shape. Preferably, the bottom surface of the base unit 100 is defined with a radius R for a length between 3 cm and 6 cm. Preferably, the length of the radius R is between 4 cm and 5 cm. More preferably, the length of the radius R is between 4 cm and 4.5 cm. A person skilled in the art in this field can change the shape and size of the base unit 100 depending upon the needs.

Figure 4A:
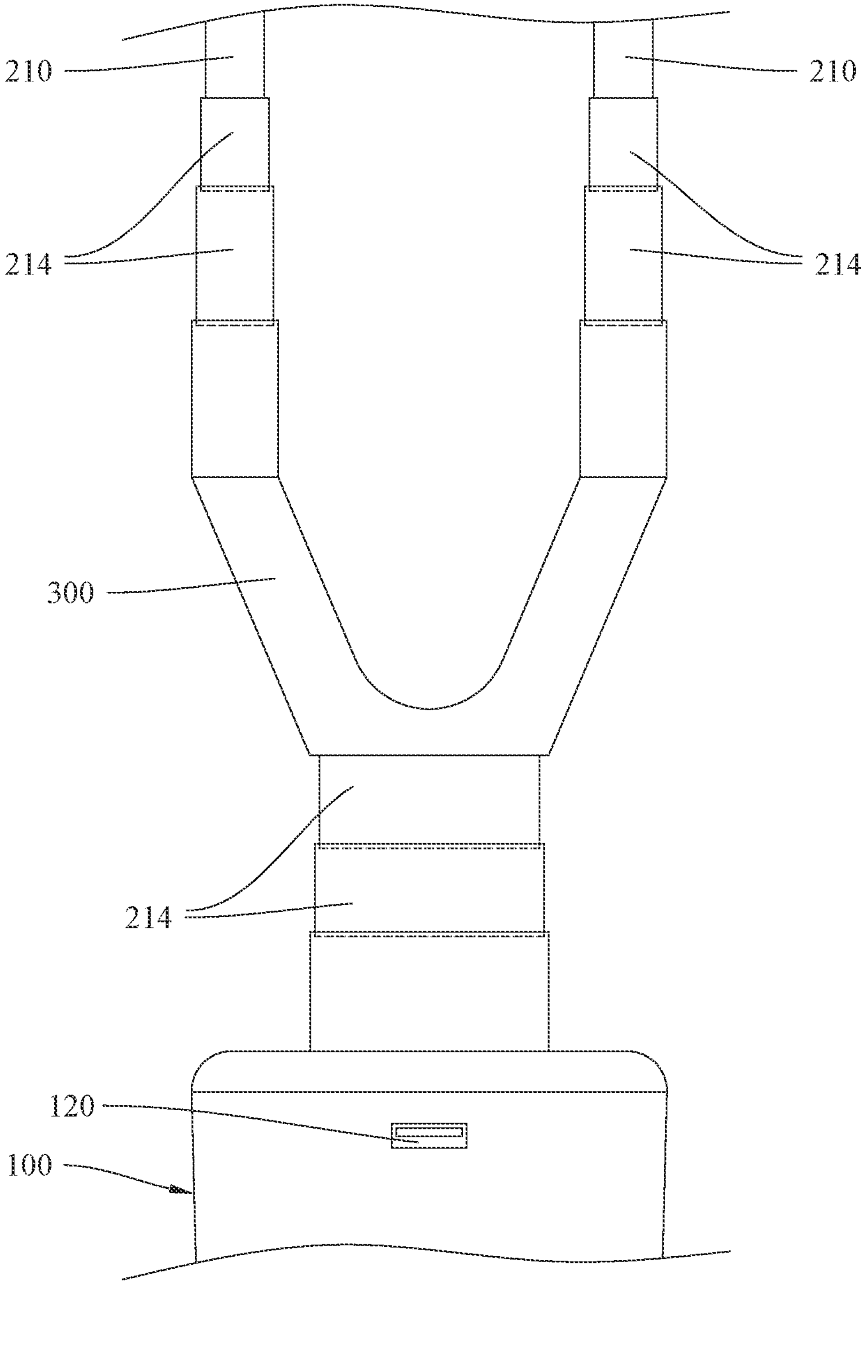
FIG. 4A and FIG. 4B are partial schematic views of the portable clothes drying device according to an embodiment of the present invention respectively.
Figure 4B:
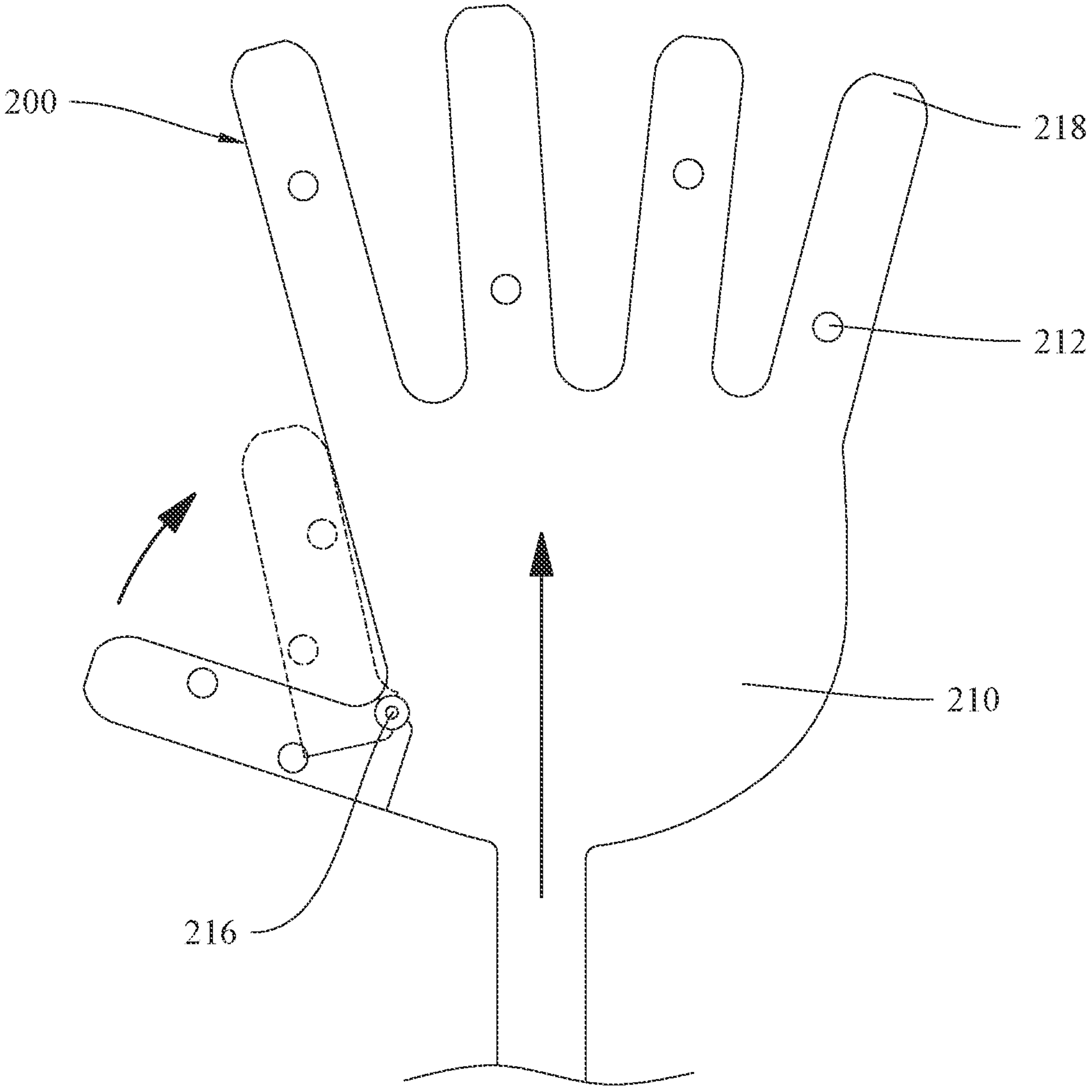

FIG. 4A and FIG. 4B show the partial schematic views of the portable clothes drying device according to an embodiment of the present invention respectively. Please refer to FIG. 1, FIG. 4A and FIG. 4B at the same time. The connecting pat 300 is connected to the base unit 100 and the air outlet unit 200. Preferably, the connecting part 300 is arranged between the base unit 100 and the extending part 210. In addition the connecting part 300 and the extending part 210 are hollow housings such that air is able to pass therethrough. Furthermore, the extending part 210 includes at least one telescoping element 214 for adjusting the length of the extending part 210. According to an embodiment of the present invention, at least one telescoping element 214 is arranged between the connecting part 300 and the base unit 100 in order to adjust a distance between the connecting part 300 and the base unit 100. To be more specific, a plurality of the telescoping elements 214 are arranged between the extending part 210 and the base unit 100 or between the connecting part 300 and the base unit 100. According to an embodiment of the present invention, the plurality of telescoping elements 214 are formed by a plurality of hollow cylindrical housings with openings arranged from large to small and stacked onto each other concentrically, thereby achieving the effect of spacing or length adjustment. In practice, any two of the plurality of hollow cylindrical housings are secured or are able to move relatively to each other via attachment slot; however, the present invention is not limited to such structure only.

According to the aforementioned content, the extending part 210 further comprises a plurality of extending ends 218. The plurality of extending ends 218 are arranged at intervals from each other. Preferably, the plurality of extending ends 218 are arranged at intervals in a geometric shape corresponding to a specific clothing. For example: if the specific clothing refers to gloves, the plurality of extending ends 218 arranged at intervals have a shape corresponding to a palm. If the specific clothing refers to socks, sows or boots, then the plurality extending ends 218 arranged at intervals have a shape corresponding to a foot (not shown in the drawings). Furthermore, at least one of the plurality of extending ends 218 can be selectively provided with a joint element 216 depending upon the needs in order to adjust the interval of the plurality of extending ends 218. According to an embodiment of the present invention, the joint element 216 is arranged at one end of the extending end 218 adjacent to the connecting part 300. Preferably, the joint element 216 can be a rotating axle in order to allow the extending end 218 to partially disengage from the extending part 210 in order to rotate, thereby adjusting the interval distance of the plurality of extending ends 218.

Figure 5:
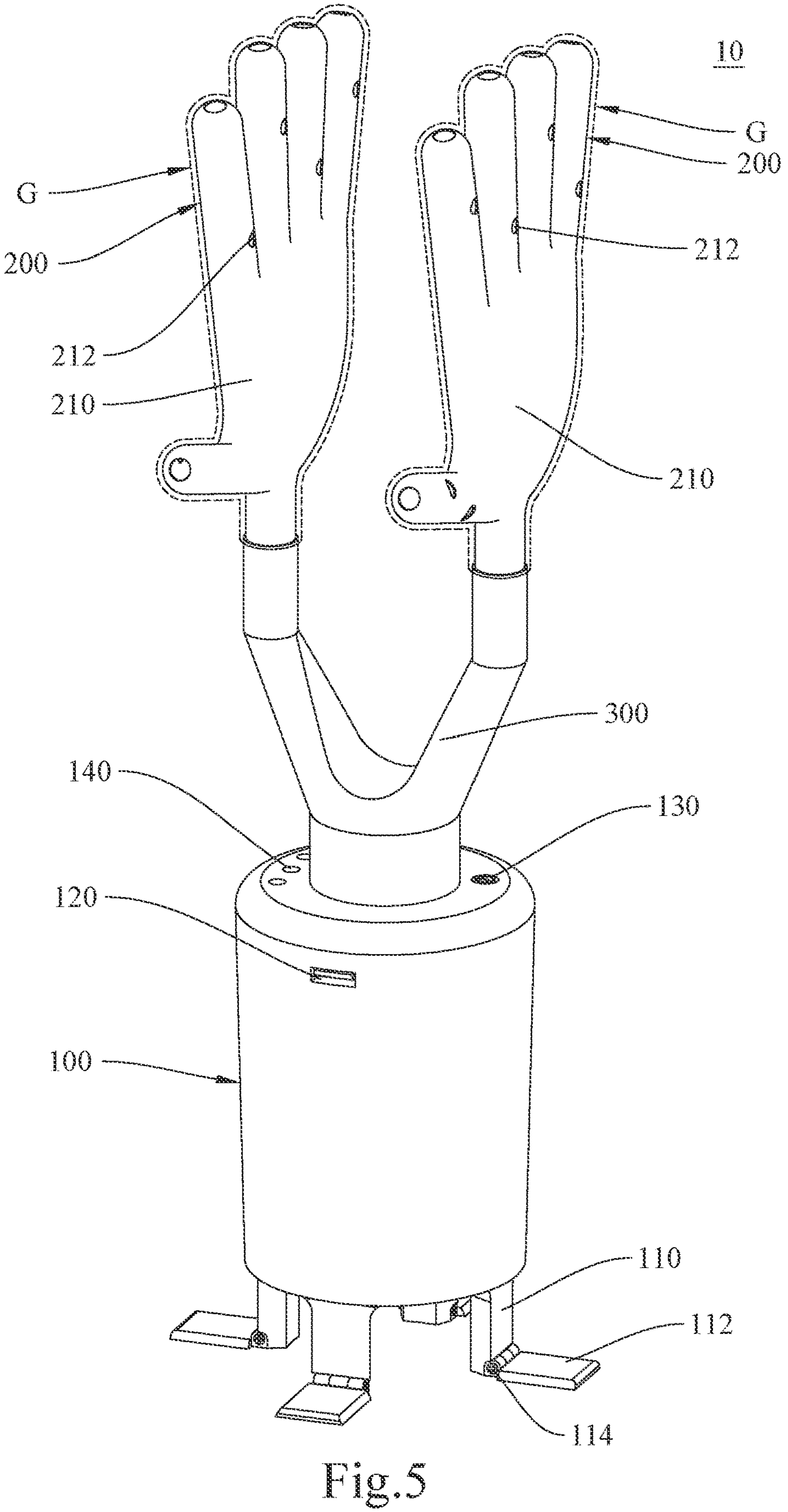
FIG. 5 is a schematic view showing a state of use of the portable clothes drying device according to an embodiment of the present invention.

FIG. 5 is a schematic view showing a state of use of the portable clothes drying device 10 according to an embodiment of the present invention. As shown in FIG. 5, during use of the device, the user is able to cover the extending part 210 with a clothing G. According to an embodiment of the present invention, the clothing G can be a pair of gloves. The portable clothes drying device 10 can obtain electricity form the power input part 120 (such as: USB port) from an external power source (not shown in the drawings) in order to supply power to various elements of the device. The use can use the power switch 130 to activate and/or control the portable clothes drying device 10. Preferably, the user can activate the all or a portion of the functions of the portable clothes drying device 10 depending upon the needs, and the signal shown by the indicator light 140 can be used to determine the current function use state of the portable clothes drying device 10.

The portable clothes drying device of the present invention is convenient for carrying to various locations for use. As shown in FIG. 5, the plurality of feet 110 and the plurality of supporting elements 112 are under opened state due to the elastic restoring force provided by the spring structure 114, such that the portable clothes drying device 10 is able to stand firmly on a flat surface. Consequently, it is applicable to the use in various spaces, such as: offices, camp sites, individual home spaces, etc. In addition, when the user place the portable clothes drying device 10 in a receiving space (such as: cup holder of a car) that partially or fully covers the plurality of feet 110 and the plurality of supporting elements 112, the receiving space is able to apply an opposite compression force on the plurality of spring structures 114 against the elastic restoring force. In other words, an outward pushing force is created between the plurality of feet 110 and the plurality of supporting elements 112 such that the base unit 100 is able to stably lock inside the receiving space of different size or shape; therefore, it is applicable to the use of transportation means of various brands and models. It shall be noted that since the plurality of feet 110 extend outward from the bottom of the base unit 100, and its bottom surface and the bottom surface of the base unit 100 are parallel to each other without being on the same plane, consequently, the spacing between the plurality of feet 110, under the condition where the portable clothes drying device 10 is placed inside the receiving space, is able to allow the external air to flow into the base unit 100 smoothly without any obstacles According to the aforementioned content, it can be understood that the portable clothes drying device 10 is able to stand firmly both on a flat surface or inside a receiving space. In addition, it is able to allow the external air to swiftly and smoothly flow into the base unit 100 without obstacles. Furthermore, according to the user's needs, the processed air can pass through the connecting part 300 to enter the air outlet unit 200 in order to further flow toward the clothing G via the extending part 210 and the air outlet hole 212.

Figure 6:
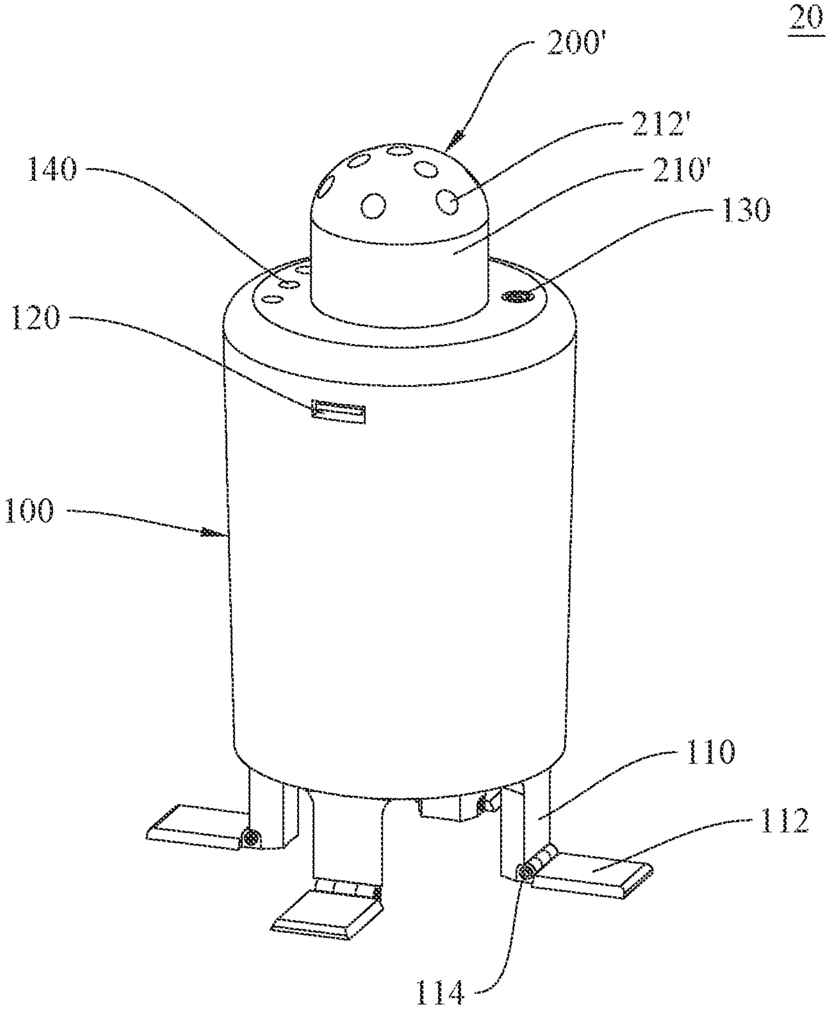
FIG. 6 is a schematic view showing a state of use of the portable clothes drying device according to an embodiment of the present invention.

FIG. 6 is a schematic view showing a state of use of the portable clothes drying device 20 according to an embodiment of the present invention. Please refer to FIG. 6, the structure of the portable clothes drying device 20 is generally similar to the aforementioned portable clothes drying device 10. However, the difference between the this embodiment and the aforementioned embodiment relies in that the air outlet unit 200' of the portable clothes drying device 20 is directly connected to the base unit 100, and the air outlet unit 200' comprises an extending part 210', which is a column structure with a top having a dome shape. In addition, the top of the extending part 210' is provided with a plurality of air outlet holes 212'. According to this embodiment, the user can place various clothes corresponding to the extending part 210', and such clothes include but not limited to snow boots. In addition, according to an embodiment of the present invention, the user can also directly use the hot air or disinfection liquid/gas generated by the portable clothes drying device 20 to perform heating or disinfection effect on the surrounding environment.

In view of the above, the portable clothes drying device provided by the present invention can be placed firmly inside various types of receiving spaces and can also stand stably on a flat surface, such that its portability is enhanced. Furthermore, the portable clothes drying device provided by the present invention can be used for various types of clothe of different geometric shapes, and is able to provide the functions of heating, drying, disinfection and cleaning, etc.

What is claimed is:

1. A portable clothes drying device, comprising:

a base unit, which comprises:

an air inlet provided at a bottom of the base unit;

a plurality of feet provided on the bottom of the base unit around the air inlet, wherein the plurality of feet extend from a surface of the bottom of the base unit;

a heating part provided inside the base unit; and an exhaust part provided inside the base unit; and an air outlet unit connected to the base unit, wherein a surface of the air outlet unit is provided with an air outlet hole;

wherein the exhaust part draws in an external air through the air inlet and sends it into the air outlet unit, and then the air is sent to an outside through the air outlet hole;

wherein each of the plurality of feet is further provided with a supporting element, which is pivotally connected to one end of each of the plurality of feet;

wherein the supporting element is a supporting piece, and a spring structure is provided between the supporting element and each of the plurality of feet to provide an elastic restoring force to open the supporting element and each of the plurality of feet.

2. The portable clothes drying device of claim 1, wherein the plurality of feet have a bottom surface parallel to the surface of the bottom of the base unit, and the bottom surface of the plurality of feet and the surface of the bottom of the base unit are not the same plane.

3. The portable clothes drying device of claim 1, wherein the base unit is further provided with a battery module and a power input part, the power input part is used for electrically connecting with an external power source, and a power source of the base unit is provided by the battery module or the power input part.

4. The portable clothes drying device of claim 1, wherein the base unit further comprises a heat insulation layer provided on an outer surface of the base unit.

5. The portable clothes drying device of claim 1, wherein the base unit further comprises a disinfection part provided inside the base unit or inside the air outlet unit.

6. The portable clothes drying device of claim 1, wherein the air outlet unit further comprises a plurality of extending parts respectively extending in a direction away from the base unit, and each of the plurality of extending parts has a surface provided with a plurality of air outlet holes.

7. The portable clothes drying device of claim 6, wherein each of the plurality of extending parts is provided with a plurality of extending ends, the plurality of extending ends are arranged at intervals, and at least one of the plurality of extending ends is provided with a joint element so as to adjust the interval of the plurality of extending ends.

8. The portable clothes drying device of any of claim 6, wherein each of the plurality of extending parts and/or each of a plurality of extending ends is provided with a telescoping element so as to adjust the length.

9. The portable clothes drying device of any of claim 7, wherein each of the plurality of extending parts and/or each of the plurality of extending ends is provided with a telescoping element so as to adjust the length.

10. The portable clothes drying device of claim 1, wherein the base unit can be placed in a cup holder for a car.

* * * * *